United States Patent [19]
Gast et al.

[11] 4,204,223
[45] May 20, 1980

[54] METHOD AND APPARATUS FOR MAKING COLOR CORRECTIONS IN THE MANUFACTURE OF PRINTING PLATES

[75] Inventors: Uwe Gast, Rammsee; Dennis Kiralfy, Quickborn; Klaus Schaefer, Rendsburg; Eckhard Slawik, Grafing; Klaus Wellendorf, Heikendorf, all of Fed. Rep. of Germany

[73] Assignee: Dr. Ing. Rudolf Hell GmbH, Kiel, Fed. Rep. of Germany

[21] Appl. No.: 912,097

[22] Filed: Jun. 2, 1978

[30] Foreign Application Priority Data

Jun. 8, 1977 [DE] Fed. Rep. of Germany ....... 2725864

[51] Int. Cl.² .............................................. G03F 3/00
[52] U.S. Cl. .................................................. 358/80
[58] Field of Search .......................................... 358/80

[56] References Cited

U.S. PATENT DOCUMENTS

3,893,166  7/1975  Pugsley .................................. 358/80

*Primary Examiner*—George G. Stellar
*Attorney, Agent, or Firm*—Hill, Van Santen, Steadman, Chiara & Simpson

[57] ABSTRACT

Apparatus and method for color correction in the manufacture of printing forms which uses a correction circuit to determine correction parameters that are stored and then used in a correcting circuit for the color correction process and wherein the determination and correction are separate processes and in which in the correction circuits there are arranged a regulating unit controlled by digital values in the path of each the signal to be corrected and that the regulating units can be adjusted for determination of the correction parameters to digital values so as to obtain the desired correction and which are then stored in a storage medium from which they can be transferred in at least one correction circuit for a subsequent color correction process.

6 Claims, 5 Drawing Figures

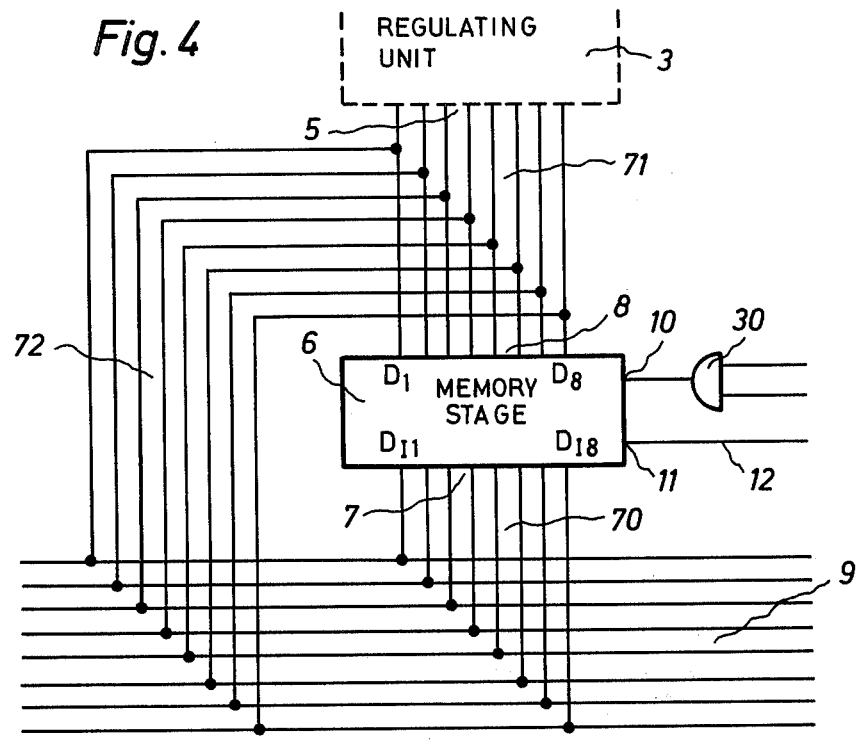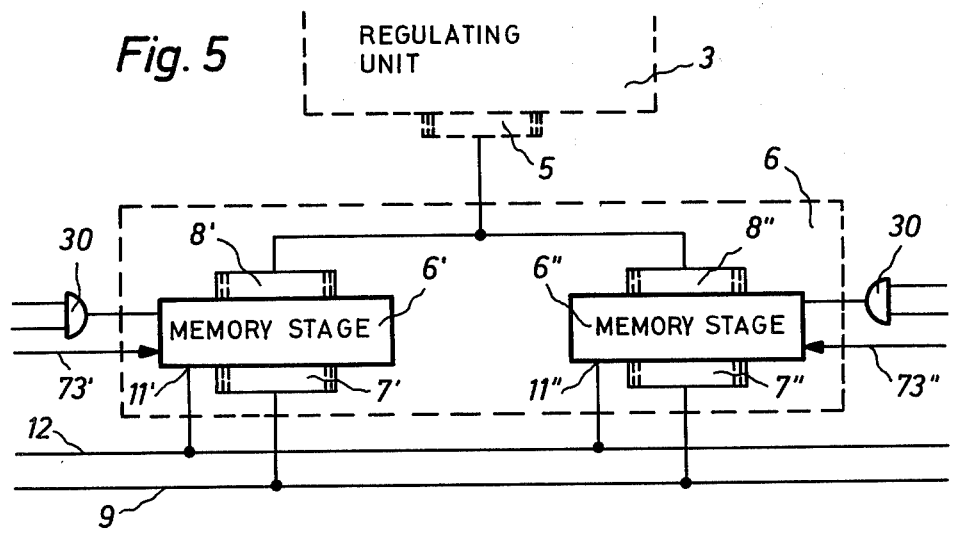

METHOD AND APPARATUS FOR MAKING COLOR CORRECTIONS IN THE MANUFACTURE OF PRINTING PLATES

BACKGROUND OF THE INVENTION

1. Field of the Invention

This invention relates in general to method and apparatus for making color corrections during the manufacture of printing forms.

2. Description of the Prior Art

Correction circuits for the manufacture of printing forms exist, for example, using color computers in color scanners and color converters in color display instruments like color previewer. A color scanner serves the purpose to produce color corrected color separations for the multi-color printing industry. So as to generate the color value signals, a color original to be reproduced is scanned by an optical electronic device. A color computer converts the color value signals according to the laws of substractive color mixing into the proper color separation signals which are amplified and fed to an recorder system. These recorder systems expose film and the exposure intensity is regulated by the modulations of the color separation signals. These films become after development the corrected color separations Magenta, Cyan and Yellow for the multi-color printing operations.

The color correction takes into account the errors of the reproduction process and make it possible to change the reproduction with respect to the original according to the desired color effect required by the customer.

The color computer calculates from the color value signals correction signals and superimposes these signals onto the color value signals so that the actuation of these color signals must be done manually in all known color computers by means of control units. Since a wide range of corrections are required and offered any color computer in the form of the base selective or part image correction, a multitude of correction parameters must be registered, fixed and at a later time as required for the actual reproduction process be then transferred to one or several color computers.

The correction parameters of a color computer can be obtained either in the color scanner itself or with the aid of a color previewer. For this purpose the color computer is removed during the determination of these parameters from the color scanner and switched into the input circuits of the color previewer.

A color previewer simulates the printing results with the aid of a TV screen of a color monitor. This makes it possible to simultaneously visually judge the effect of a correction while the color computer is adjusted and makes it possible to check the final results on the TV screen. The color previewer generates by scanning an original image which is to be produced with the help of a color television camera three color value signals which correspond to the output signal of an optical electronic scanner in a color scanner. These color value signals are transformed in the color computer which has to be adjusted into the corrected color separation signals.

A color transformer follows the color computer stage which transforms the color separation signals into the input signals for the color monitor so that the representation on a TV screen will be of the same appearance as the finished multi-color print.

So that this multi-color print simulation will be true in color a large number of correction parameters must be used for the correction of a color transformer and these are set by manually activated controls. A new program for the color transformer is for example always required when a particular custom or job changes or when the printing process changes or the printing ink or the printing paper for the following printing processes are changed. Thus, there are many disadvantages of prior art correction circuits. Also, during a test run, a multitude of correction parameters must first be adjusted by manually changing the control settings of an input system and by measuring and observing the corrections. Once the proper correction parameters are established they have in the prior art been written down in form of a table such that they can be used at a later time and/or whenever the need arises they can again be transferred manually into one or several correction circuits.

Such operations are time consuming and expensive and they do not allow for standardization or automation of the reproduction processes. Additionally, the accuracy in the determination of the correction parameters in their reproducibility when transferred to a correction circuit depends to a large extent on the dexterity and color perception of a particular operation. Additionally, it is important for an economical reproduction process that the time required for the adjustment of the correction circuits be comparatively short relative to the time required for recording of the color separation values. Short set up times are only possible however, if many adjustments are simplified and can be accomplished automatically.

SUMMARY OF THE INVENTION

The present invention has an object to provide a process for color correction which eliminates the disadvantages of the prior art and results in shortening the total time required for the adjustments in the reproduction process and results in much more accurate corrections.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure and in which:

BRIEF DESCRIPTION OF THE DRAWINGS

FIG. 4 is a block diagram for a memory stage; and

FIG. 5 illustrates an additional example of a memory stage.

DESCRIPTION OF THE PREFERRED EMBODIMENTS

Figure 1:
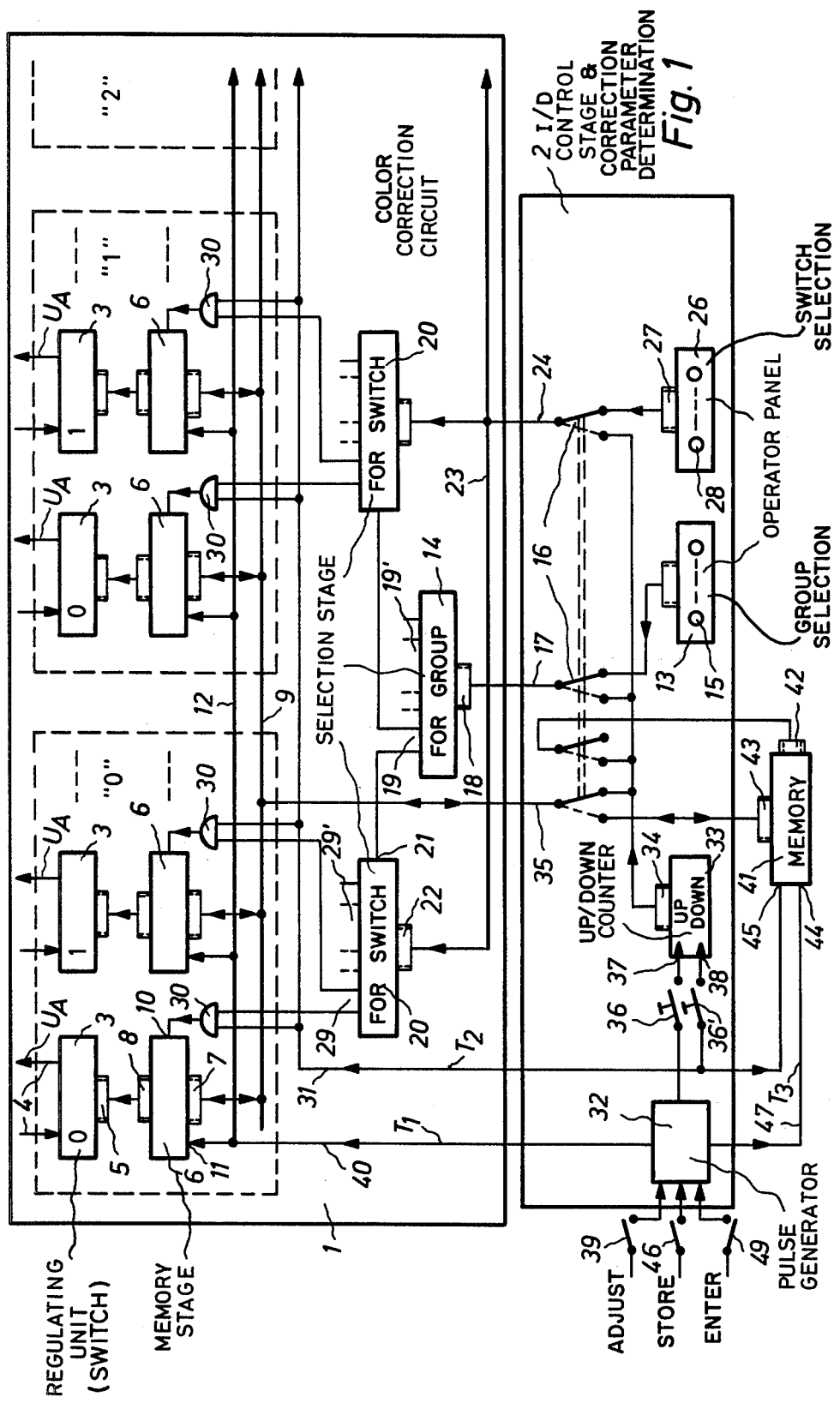
FIG. 1 is a block diagram of a correction circuit arrangement.

FIG. 1 is a block diagram of a correction circuit arrangement which is used to explain the inventive process. The invention consists of the actual correction circuit 1 and of an input/output control stage 2 which determines the correction parameters and which is controlled through its input and output. The correction circuit 1 can be, for example, a color computer or color converter. The correction circuit 1 includes a multitude of regulating units subsequently called switch members 3 which are located in the paths 4 of signals $U_A$ that require correction. A switch member influences a signal to be corrected under the control of correction parameters in the form of binary information at the data input 5 of the switch member 3. The influence may be analog or digital. FIG. 1 illustrates four switch members 31 but a larger number can be used.

Each switch member 3 has associated with it a memory stage 6 which includes an input data terminal 7 and an output data terminal 8 and each of the memories can store one or several correction parameters. The number of bits for storing the correction parameter depends on the required accuracy for the desired correction which is to take place. In a specific embodiment the correction parameter was represented by an eight bit binary word. The data input 7 of all of the memory stages 6 are connected to a data bus line 9. The transfer of data between the data bus 9 and the memory stages 6 is controlled by a clock pulse train $T_2$ which is applied at pulse inputs 10 of each of the memories 6 and by command inputs supplied to the inputs 11. The inputs 11 of all of the memory stages 6 are connected to each other with a common command bus 12.

It is expedient to divide the switch members 3 of the correction apparatus into individual groups. Depending on the correction system used it is desirable to differentiate, for example, in the color computer between a group used for the "base correction" and provide another group for "selective correction". In FIG. 1, for example, a group "0" and a "1" each containing two switch members 3 is illustrated. An additional group "2" is indicated at the right of FIG. 1. The switch members 3 within a group are successively numbered. It is to be realized, of course, that the number of groups and of the switch members per group can be selected as desired.

In order to select the groups and switch members each group and each switch member can be addressed in any desired sequence so as to determine the parameters for the corrections and their input and output values. For the selection of a group there is provided a first operator panel 13 in the input/output control 2 and it supplies an input through a switch 16 and lead 17 to a group selection stage 14. At the operator panel 13, the group number addressed by means of the push buttons 15 is converted into a four bit BCD/word and transferred through the switch 16 and line 17 to the BCD input 18 of the group selection stage 14. The group selection stage 14 is designed as a BCD decimal decoder. For example, an integrated circuit of the type SN7442 manufactured by Texas Instrument could be used for this purpose. Numerous integrated building blocks are known to those skilled in the art and available on the market and detail description of the design and functional properties will not be given herein.

The outputs 19 of the group selection stage 14 are numbered by decimal numbers from 0 to 9. The particular output 19 always initiates the H signal which has the corresponding number equivalent represented in binary input information in BCD code. Each individual group has a coordinated number of switch member selection stages 20. The enabling input 21 of a switch member selection stage 20 is always connected to the output 19 from the group selection stage 14. The outputs 19' are available for connection of additional switch member selection circuits. The switch member selection stages 20 consist of BCD decimal decoders which have enable inputs for example of integrated circuit type SAB8205 manufactured by the Siemens Corporation. The inputs 22 of all switch member selection stages 20 are all connected to an address bus 23 which is further connected to the switch 16 by means of cable 24 and to the operator panel 26 "switch member selector." The outputs 27 of the operator panel 26 always carry the particular selected switch member number in the form of a four bit BCD binary word activated by means of the push buttons 28 of the operating panel 26. The outputs 29 of the switch member selection stage 20 which also carry the number 0 to 9 are each connected to AND gates 30 which in turn are connected to clock inputs 10 of the memory stages which are associated with the particular digit. The unused outputs 29' of a switch member selection stage 20 can be used to connect additional switch members to the same group. The second inputs of the AND gates are connected in common to a clock pulse line 31 and receive a pulse from the input/output control circuit 2 from a pulse generator 32.

The correction parameters are determined in the following manner. The operator first decides which switch member within a group is going to be used for the determination of the correction parameters. For example, the switch member "1" of group "0" might be chosen by depressing the corresponding push buttons on the operator panels 13 and 26. In this instance, the first output 19 of the group selection stage 14 carries an H signal whereby the switch member selection stage 20 of group "0" is enabled.

Corresponding to the initiated binary "1" in the address bus 23 the second output 29 of this particular switch member selection stage 20 reaches the H range. The correction parameters can then be determined for the switch member "1" of the group "0". In order to call in different digital correction parameters, provisions are made in the input-output control circuit 2 to have an updown binary counter 33 which includes a counter that according to the chosen word length for the correction parameters in the specific example might be eight bits.

The output 34 of the up-down counter 33 is connected by a switch 16 and the conductor 35 to the data bus 9. By means of the switch 36, the pulse $T_2$ is fed in the form of a counting pulse either into the up counter input 37 or the down counter input 38 of the up-down counter 33 where by the counter position is either increased or decreased. By depressing a key 39 marked "Adjustment", the pulse generator 32 forms the write-out commands T which are transferred to the command bus 12 by means of conductor 40. Since the counter pulse $T_2$ appears simultaneously as the transfer pulse only at the pulse input 10 of the address switch member "1" which belongs to the memory stage 6, the present counter position of the up-down counter 33 is recorded as the correction parameter in the memory stage 6 and the correction signal which is to be influenced by the switch member "1" is constantly changed until the final correction parameter for the switch "1" has been located.

During this process, the changes of the correction signal can be observed, for example, by the use of a measuring instrument or they could be displayed on a TV screen of a color display monitor.

After this process has been completed, the remaining switch members are successively addressed and the above explained process is repeated until finally all correction parameters are stored in the memory stages 6 of the correction circuit 1. If the correction circuit 1 is to be used for other purposes after the determination of the correction have been made, then such correction parameters can be stored in a suitable storage medium where they can be recalled whenever required at a later date. Such other storage medium may be a punch card, magnetic tape, a semiconductor memory or a disc memory. FIG. 1 illustrates a memory 41 which has an address input 42 and a data input/output 43, a command input 44 and a clock input 45 which is connected as shown.

The memory 41 can be constructed, for example, by using a number of read-write 64 by eight bit Random Access Memories of type TMS4036 manufactured by Texas Instrument Corporation.

The transfer of correction parameters into storage can be accomplished by transferring the correction parameters which are stored in the memories 6 into the memory 41 through the switch 16 shown by dash lines. This connects the data input/output 43 by means of the conductor 35 to the data bus 9, and the address input 42 to the output 34 of the up-down counter 33. The operator panels 13 and 26 are disconnected at this time. The input 18 of the group selection stage 14 is connected by the conductor 17 to the four high value outputs 34 of the up-down counter 33 and the address bus 23 is connected to the four low value outputs 34 such that the four low value bits of the eight bit counter information is addressing the switch members and the four high value bits are addressing the groups.

The up-down counter 33 simultaneously calls up the addresses of the memory 41 corresponding to the actual counter position.

By depressing the key 46 "store" at the pulse generator 32 read commands $T_1$ are transmitted to the command bus 12 and write commands $T_3$ are transmitted by means of conductor 47 to memory 41. After closing the key 36', the pulse $T_2$ is counted in the up-down counter 33 such that the counter position continuously increases starting with 0 and addressing successively all memory stages 6 of group "0" then the ones of group "1" and so on and the corresponding addresses of the memory 41 according to their eight bit identification codes. At the same time the transfer of the correction parameters from the individual storage stages 6 into the memory 41 takes place.

It is advantageous to remove the storage medium after transfer of the correction parameters from the arrangement for filing purposes. The correction circuit is then available for processing other problems. Once the correction data has been determined and filed, it can whenever the need arises quickly be reintroduced into the storage medium or any other desired correcting circuit thus saving considerable time for making adjustments.

If for example, the file correction data was generated during reproduction of an original image it is possible to transfer it at a later time whenever the same image original has to again be reproduced and the correction data preferably can be transferred directly from the storage medium into the correction circuit without the requirement for any further adjustments. The filed correction parameters can also be filed in the form of a standard correction plan which can be used for a particular reproduction.

Entry of correction parameters into the correction circuit is accomplished as follows. As previously mentioned, the stored correction parameters are re-entered whenever the need arises into any one correction circuit or into the same correction circuit 1 as shown in FIG. 1. For this purpose, the memory 41 is reconnected into the arrangement of FIG. 1 and the switch 16 is moved to the position indicated by dotted lines. After depressing the key "entry" at the pulse generator 32, pulses are generated for the control of the data transfer from memory 41 to the individual storage stages 6 of the switch members 3 by the write command $T_1$ which is supplied on the command bus 12 and read commands $T_3$ that are supplied to the memory 41. The up-down counter 33 is activated by the counter pulses $T_2$ due to the closed switches 36' and addresses successively the individual counter stages 6 and the corresponding addresses in memory 41.

The correction data as written into the correction circuit 1 could, for example, correspond to a base adjustment or could also be individually changed if the need arises for either the one or the other switch members by means of the operator panels 13 and 26. It is further of advantage to have all corrections changed back to zero or cancelled by a single reset pulse on the command bus 12.

The discussion up to this point has been with regard to a correction circuit generally. For an illustrative practical example, the color computer in color scanners or the color computer in color display instruments can be used. A circuit diagram for a color computer is shown, for example, in FIG. 3 of copending U.S. patent application Ser. No. 770,192 entitled "Apparatus For Producing Corrected Color Chromatic Components" in which the inventor is Siegfried Klopsch which was filed on Feb. 18, 1977 and is assigned to the assignee of the present invention. This application Ser. No. 770,192 discloses in FIG. 4 a circuit diagram for a color converter that can be used in the present invention. So as to adapt these units to the present invention, all illustrated potentiometers in the structure shown in application Ser. No. 770,192 would be replaced by corresponding switch members 3. The correction process covers all areas of correction in the process of reproduction such as base- and selective corrections, partial corrections controlled by a guide mask or by the color of the image, under color removal (UCR), contrast in details, density and gradation.

Figure 2:
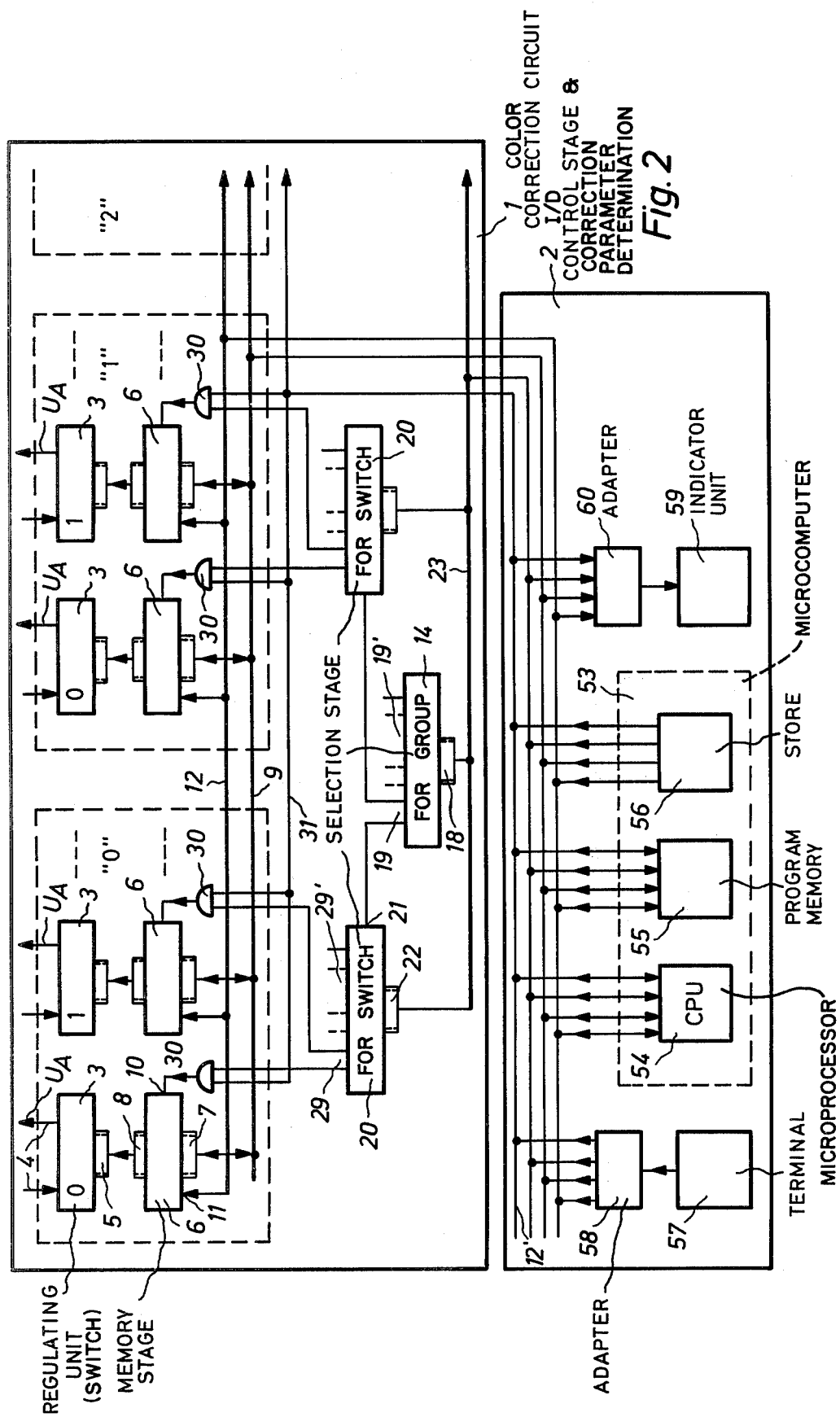
FIG. 2 is a block diagram for an input/output control circuit.

FIG. 2 comprises a block circuit diagram which illustrates a preferred example of the input/output control 2 where the determination as well as the input/output of the correction parameters is accomplished by the use of a microcomputer.

The microcomputer 53 consits of a microprocessor 54 and its control and calculator portion and further includes the program memory 55 and the data storage means 56. The microprocessor 54 sometimes referred to as a central processing unit CPU may be manufactured, for example, as an integrated circuit block form of type SAB 8080 manufactured by Siemens AG. The program storage 55 as used for the application program may be a static or programmable read only memory, for example of type SAB 8308 available from Siemens AG. The data storage 56 for the intermediate data can be accomplished with a read-write memory RAM of type SAB 8102-2 manufactured by the Siemens AG. It is also possible to use corresponding adapter circuits and any other storage medium in the form of tape discrete or punch tape could be used.

For peripheral equipment and input terminal 57 and its adapter stage 58 as well as an indicator unit 59 with its particular adapter 60 is utilized and connected as shown.

Microcomputer 53, the adapter stages 58 and 60 and the correction circuit 1 are actively connected to each by means of the bus bars 9, 12, 12′ and 23 as shown. According to the examples illustrated in FIGS. 1 and 2 the determination of the correction parameters are accomplished with the aid of an operator. The process according to the invention is however especially suitable for accomplishing a high degree of automation in the adjustment of the correction circuits so as to save time and money.

In the case of adjustments of a color computer in a scanner for example, a color table having a multitude of patches of standard colors is scanned opto-electronically and the color value signals are corrected in the color computer and the corrected color separation signals are recorded in the form of chromatic separations. By means of the chromatic separations a color table is printed which is compared in a suitable analyzing instrument with the original color table so as to obtain from this comparison the corresponding correction parameters for the color computer.

The comparison can be restricted especially to the corner colors of the color table. During adjustment of a color converter the reference input of the color value signals are simulated at the input which are transformed into the drive pulses for the color monitor. In the next step, the color table as represented on the viewing screen of the color monitor is compared to the previously prepared color print table (color atlas) and the adjustments of the color converter are changed until the two color tables agree with each other in regard to their color values.

Figure 3:
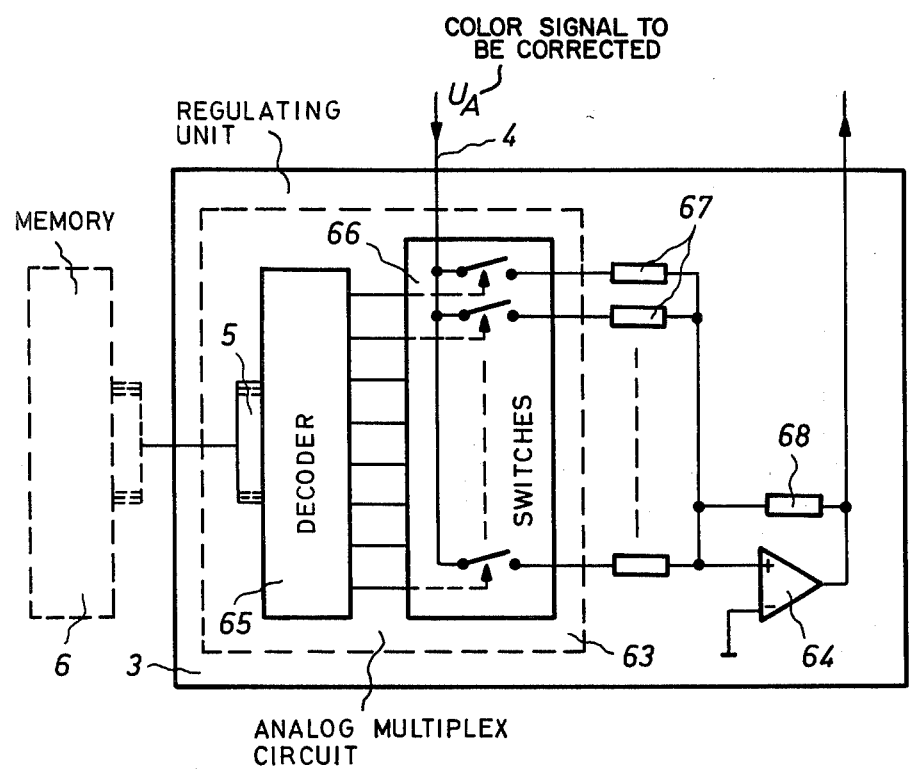
FIG. 3 is a block diagram for a switching member.

FIG. 3 comprises an illustrative example for a switch member where the input of the correction data is accomplished in digital fashion. However, the adjustments of the analog signal $U_A$ which is to be corrected may be done in analog fashion. The switch member 3 is composed of an analog multiplex circuit 63 and a multitude of integrated MOS field effect transistors which comprise switches 66. The switching inputs in common form the input of the switch member 3 so as to correct the signal $U_A$. The switch outputs are connected by means of different value protective resistors to the operational amplifier 64 which has reverse feedback by means of resistor 68 which connects its output to its input and the output of the amplifier 64 comprises the output of the switch member 3.

The ratio of the switched in protective resistors 67 which are connected in by means of the switches 66 to the reverse feedback resistors determines the degree of amplification of the operational amplifier 64 and therefore also the degree of interference of the analog signal $U_A$ which is to be corrected. The individual switches 66 can be addressed by the BCD-decimal decoder 65. A BCD-input of decoder 65 corresponds to the data input 5 of the switch member 3 which is controlled by the corresponding correction parameters in BCD code.

In one of the circuit diagram variations, the switch member 3 consists of a multiplier stage as, for example, type AD 7520 manufactured by Analog Devices Corporation to which is fed the analog signal $U_A$ which is to be modified as well as the correction signal which was obtained by digital to analog conversion of the correction data. The switch member 3, however, can also consist of a multiplying digital analog converter which has a digital input that is controlled by the correction data and the reference input which is governed by the analog signal $U_A$ which is to be modified. It is to be understood that the signal to be modified $U_A$ can also be present in digital form. Each time before and after the switch member a corresponding signal conversion is performed. A digital control of the switch member in combination with an analog modification of the signal to be corrected (hybrid technique) is preferentially used in the case when the signal has a large band width due to a high processing speed.

For example, the color computer and the color converter have to be able to process the TV band width if they are switched into the signal path between the TV camera and monitor in a color display instrument due to the fact that the scanning rate of the original is accomplished with a video frequency of 5 kHz.

It is within the concept of this invention to perform the signal modifications digitally also and for this purpose the switch member can consist, for example, of four bit parallel multipliers of type 74284 manufactured by the Siemens AG Company.

FIG. 4 is an illustrative example of a storage stage 6 for the correction parameters. The storage stage 6 is an input/output integrated circuit, for example, of the type SAB 8212 manufactured by the Siemens AG Company which incorporates an eight bit data memory followed by output buffer stages and a control logic. The data memory consists of eight D-flipflops and the D inputs correspond to the input 7 of the storage stage 6.

The output buffer stages in their three possible states that can exist in the outputs 8 can be controlled in such fashion that either the outputs 8 for data transmission are switched to the outputs of the data memory directly or placed in a highly resistant mode. The inputs 10 and 11 of the storage stage 6 are connected to the command bus 12 and to the AND gate 30. The input of the correction data arrives by means of the data bus 6 into the storage stage 6 and is accomplished by means of the conductor 70 and transferred into the switch member 3 by means of conductor 71. For the output of the correction data in storage stage 6 to the data bus 9, the conductor 72 are provided. During data transfer between the data bus 9 and one of the storages 6, the outputs of all other storage stages 6 which are connected to the data bus are placed in a high resistance state.

FIG. 5 illustrates an additional example of a storage stage. It has proved practical to equip the storage stage 6 with at least two input/output building blocks 6′ and 6″ so as to store all of the different correction parameters. The data inputs 7′ and 7″ are also connected to the data bus 9. The data outputs 8′ and 8″ are commonly connected to the data inputs 5 of a switch member 3.

During the adjustment process the switch member 3 can be selected by choice to be controlled by the different correction parameters. The selection takes place by means of the control signals in conductor 73′ and 73″.

The control signals change the data outputs 8′ and 8″ into high resistance conditions such that the respective input/output integrated circuit block cannot transfer correction parameters to the switch member 3.

As an application for the control switch over of correction data during the manufacture of color separations and during color direct gravur, correction changes during the reproduction process which are limited to certain areas of the picture original can be accomplished. For this purpose, it is important to obtain high speed error free switchover of the correction data in a color computer even if the correction data might differ from image point to image point. This correction can be related either to the high light of the image, the color, the gradation or the density.

The control signal for switching over of the correction data can originate from a guide mask which is opto-electronically scanned and is synchronized and in registration with the original to be reproduced or it could originate from a guide mask which was digitally stored.

As a further application for the control switch over of correction data the correction parameters of a color converter in a color previewer can be switched depending on the instantaneous local position of the electron beam in the color monitor, in order to eliminate color and/or convergence errors of the color monitor in certain areas of the TV screen.

Relative to FIG. 2, a description of microcomputer 53 is given in the book "Software Design for Microprocessors," John G. Wester, Texas Instruments Learning Center, Copyright 1966 by Texas Instruments Incorporated.

Although the invention has been described with respect to preferred embodiments, it is not to be so limited as changes and modifications can be made which are within the full intended scope of the invention as defined by the appended claims.

We claim as our invention:

1. Apparatus for color correction in the manufacture of printing forms comprising a correction circuit including a group selection stage, means for energizing the group selection stage to select a particular group and at least two setting members in each group, selection stages associated with each group, means for energizing the selection stages to select a particular setting member in the group, said setting members receiving the signals to be corrected and having at least two registers for storing the digital adjusting values, a storage medium for storing said digital adjusting values, transfer means connected to the setting members and said storage means and computer means operately connected to said stages, said energizing means and said transfer means.

2. The method of color correction in the manufacture of printing forms wherein a correction circuit is used to determine adjusting values for each correction parameter and such values are used in correction circuit for the color correction process and wherein the determination and correction are separate processes, wherein for each correction parameter in the correction circuits there is provided a setting member mounted in the path of a signal to be corrected, said setting members being controlled by stored digital adjusting values, varying said signals in an analog manner in dependence of said digital adjusting values, adjusting the setting members of a correction circuit to the digital adjusting values which result in a desired correction, transferring the digital adjusting values determined in the correction circuit into a storage medium outside of the correction circuits for a later use, and feeding said stored digital adjusting values for an actual color correction to at least one correction circuit and storing them in the associated setting members of said correction circuit, and said process being controlled by computer means.

3. The method of claim 2, wherein the adjusting of the setting members to the digital adjusting values which result in a desired correction is accomplished by a colorimetric comparison of a color table having a plurality of different color patches with a correctly reproduced and printed color table.

4. The method of claim 2, wherein the adjusting of the setting members to the digital adjusting values which result in a desired correction is accomplished by a colorimetric comparison of a printed color table with the color table displayed on a color monitor.

5. The method of claim 2 wherein several different digital adjusting values are stored in a setting member and wherein the setting member is controlled selectively during color correction by said different digital adjusting values as dictated by control signals.

6. The method of claim 5, wherein the control signals are generated by scanning a guide mask.

* * * * *